US012695109B2

(12) United States Patent
Oh et al.

(10) Patent No.: US 12,695,109 B2
(45) Date of Patent: Jul. 28, 2026

(54) APPARATUS FOR INSPECTING STACKING OF ELECTRODES OF SECONDARY BATTERY AND INSPECTION METHOD THEREOF

(71) Applicant: SK On Co., Ltd., Seoul (KR)

(72) Inventors: Young Rae Oh, Daejeon (KR); Ji Won Yang, Daejeon (KR); Jae Young Jung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 17/569,993

(22) Filed: Jan. 6, 2022

(65) Prior Publication Data

US 2022/0216501 A1     Jul. 7, 2022

(30) Foreign Application Priority Data

Jan. 7, 2021     (KR) ........................ 10-2021-0002093

(51) Int. Cl.
H01M 10/04          (2006.01)
H01M 10/0583          (2010.01)

(52) U.S. Cl.
CPC ...  H01M 10/0404 (2013.01); H01M 10/0583 (2013.01)

(58) Field of Classification Search
CPC ............... H01M 10/04; H01M 10/045; H01M 10/0404; H01M 10/0431; H01M 10/0459;
(Continued)

(56) References Cited

U.S. PATENT DOCUMENTS

2014/0027643 A1*   1/2014   Aramaki ................. H01M 4/04
                                                         250/341.8
2014/0185058 A1*   7/2014   Hirayama ............ G01B 11/306
                                                         356/601
(Continued)

FOREIGN PATENT DOCUMENTS

CN          104577210 A      4/2015
CN          109643820 A      4/2019
(Continued)

OTHER PUBLICATIONS

JP-2017135019-A (2017)—Machine Translation (Year: 2023).*
(Continued)

*Primary Examiner* — Allison Bourke
*Assistant Examiner* — Bethany C Garcia
(74) *Attorney, Agent, or Firm* — IP & T GROUP LLP

(57) ABSTRACT

Embodiments provide an apparatus for inspecting stacking of electrodes of a secondary battery. The apparatus includes a separator supply device, a stacking main body having a stacking table formed on one surface and configured to allow the separator to be stacked on the stacking table, a stacking jig configured to stack an electrode plate on the separator stacked on the stacking main body, a fixing jig, alighting device configured to emit light from one surface of the stacking table to allow the light to pass sequentially through the separator and the electrode plate, and a capturing unit configured to capture an image of the light that has passed through the separator and the electrode plate. Accordingly, reliability and efficiency may be secured in an electrode stacking process of a secondary battery.

7 Claims, 15 Drawing Sheets

(58) Field of Classification Search

CPC ......... H01M 10/0468; H01M 10/0583; H01M 10/0585; H01M 4/04; H01M 4/139; H01M 10/0413; H01M 10/0525; H01M 10/058; H01M 10/4285; H01M 10/48; H01M 10/0463; H01M 10/052; G01N 21/01; G01N 2021/0112; G01N 2021/0181; G01N 2021/88; G01N 2021/95; G01N 2021/8887; G01N 21/8806–956; G01N 21/88; B32B 2457/10; B32B 37/02; B32B 37/0046; B32B 41/00; B65H 18/08; Y10T 29/49108; Y10T 29/53135; G06T 7/0002; G06T 7/0004; B65G 29/00; B65G 15/00; B65G 2201/02; G01B 9/02063; G01B 11/028; G01B 11/25; G01B 11/306; Y02E 60/10; Y02P 70/50; A47B 13/12

See application file for complete search history.

(56) References Cited

U.S. PATENT DOCUMENTS

| | | | | | |
|---|---|---|---|---|---|
| 2019/0341658 | A1* | 11/2019 | Han | ................. | H01M 10/0585 |
| 2020/0386805 | A1* | 12/2020 | Kasai | ................ | H01L 27/14621 |

FOREIGN PATENT DOCUMENTS

| | | | |
|---|---|---|---|
| CN | 110441325 | A | 11/2019 |
| EP | 3565052 | A1 | 11/2019 |
| JP | 6142525 | B2 | 6/2017 |
| JP | 2017135019 | A * | 8/2017 |
| JP | 6344122 | B2 | 6/2018 |
| KR | 20130082044 | A | 7/2013 |
| KR | 101359564 | B1 | 2/2014 |
| KR | 101421847 | B1 | 7/2014 |
| KR | 101933550 | B1 | 12/2018 |
| KR | 101956758 | B1 * | 3/2019 |
| KR | 20190114322 | A | 10/2019 |
| KR | 10-2020-0023854 | A | 3/2020 |
| KR | 102370749 | B1 | 3/2022 |
| KR | 102383177 | B1 | 4/2022 |
| WO | 2011030377 | A1 | 3/2011 |
| WO | 2020130184 | A1 | 6/2020 |

OTHER PUBLICATIONS

JP 2017135019 A—English translation with paragraph numbering (Year: 2024).*

EP21218138.2 Extended European Search Report dated Jun. 9, 2022, 6 pgs.

Office Action for Korean Patent Application No. 10-2021-0002093 issued by the Korean Patent Office on Jan. 24, 2025.

Office Action for Korean Patent Application No. 10-2021-0002093 issued by the Korean Patent Office on Sep. 9, 2025.

Office Action for Chinese Patent Application No. 202210016252.8 issued by the Chinese Patent Office on Apr. 25, 2026.

* cited by examiner

APPARATUS FOR INSPECTING STACKING OF ELECTRODES OF SECONDARY BATTERY AND INSPECTION METHOD THEREOF

CROSS REFERENCE TO RELATED APPLICATION

The present application claims the benefit of and priority to Korean Patent Application No. 10-2021-0002093, filed Jan. 7, 2021, the entire contents of which is incorporated herein for all purposes by this reference.

BACKGROUND OF THE INVENTION

Field of the Invention

Embodiments relate to an apparatus for inspecting stacking of electrodes of a secondary battery and an inspection method thereof.

Description of the Related Art

In general, secondary batteries are batteries capable of being used repeatedly through a discharging process of converting chemical energy into electric energy and a charging process that is the reverse direction of the discharging process. Types of secondary batteries include a nickel-cadmium (Ni—Cd) battery, a nickel-hydrogen (Ni-MH) battery, a lithium-metal battery, a lithium-ion (Ni-Ion) battery, and a lithium-ion polymer battery (hereinafter referred to as 'LIPB').

A secondary battery includes a positive electrode, a negative electrode, an electrolyte, and a separator, and stores and generates electricity by using a voltage difference between different positive and negative materials. Discharging is the movement of electrons from a high-voltage negative electrode to a low-voltage positive electrode (i.e., electricity is generated as much as the voltage difference between both electrodes), and charging is the movement of electrons from the positive electrode to the negative electrode again. The positive electrode material receives electrons and lithium ions to be returned to an original metal oxide. A charging current flows as metal atoms move from the positive electrode to the negative electrode through the separator when a secondary battery is charged, and the metal atoms move from the negative electrode to the positive electrode and a discharging current flows when the secondary battery is discharged.

The field of quality control, that is the most basic in a battery manufactured by an electrode stacking method among the battery manufacturing methods, relates to whether electrode components are stacked in a normal order and arrangement. When any of the electrode components of the stacked battery is arranged in an abnormal order or is missing, the battery cannot be used as a battery due to a short circuit, abnormal operation, etc., and may explode in severe cases.

On the other hand, the methods for manufacturing such a secondary battery are divided into a winding method and a stacking method, and the stacking method is a method of alternately stacking positive and negative plates cut to a predetermined size to manufacture an electrode assembly. In this regard, Korean Patent Registration No. 1421847 (May 31, 2012) is disclosed. However, in the past, there was a problem in that it was not possible to detect defects such as misalignment of the electrode plates and lifting in an electrode stacking process and the like.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) KR 10-1421847 B1

SUMMARY OF THE INVENTION

Accordingly, the present disclosure has been made keeping in mind the above problem occurring in the related art, and the present disclosure is intended to provide an apparatus for inspecting stacking of electrodes of a secondary battery to efficiently secure stacking alignment and stacking reliability in a stacking process of a secondary battery and an inspection method thereof.

In addition, the present disclosure is intended to provide an apparatus for inspecting stacking of electrodes of a secondary battery, in which reliability of an electrode stacking process of the secondary battery is inspected in real-time during the process, so that reliability of secondary battery manufacturing may be secured and amore precise electrode assembly may be manufactured, and an inspection method thereof.

An apparatus for inspecting stacking of electrodes of a secondary battery according to an embodiment of the present disclosure may include: a separator supply device configured to supply a separator; a stacking main body having a stacking table formed on a first surface thereof and configured to allow the separator to be stacked on the stacking table; a stacking jig configured to stack an electrode plate on the separator stacked on the stacking main body; a fixing jig configured to fix a first surface of the electrode plate in a stacking direction; alighting device configured to emit light from a first surface of the stacking table to allow the light to pass through the separator and the electrode plate; and a capturing unit configured to capture an image of the light that has passed through the separator and the electrode plate, wherein the fixing jig is disposed on a path of the light that is emitted from the lighting device and passes through the separator and the electrode plate, and an open hole is formed on an extension line of the path of the light that passes through the separator and the electrode plate.

The stacking main body may include a rotary shaft and allows the separator to be stacked on the stacking table in a zigzag direction as reciprocating in a direction from a first side of the rotary shaft to a second side of the rotary shaft, wherein the stacking main body allows a first electrode plate to be stacked on a first separator in a first direction of the rotary shaft by the stacking jig, and allows a second electrode plate to be stacked on a second separator in a second direction of the rotary shaft by the stacking jig.

The lighting device emits light to allow the light to pass through a first stacked body in which the first separator, the first electrode plate, the second separator, and the second electrode plate are sequentially stacked, and the fixing jig is disposed on a first surface of the first stacked body and fixes the first stacked body, wherein the fixing jig has the open hole formed on the path of the light that has passed through the first stacked body.

3

The lighting device may include a lighting unit configured to emit light to allow the light to pass through the first stacked body and an angle adjustment unit configured to adjust an emission angle of the light emitted by the lighting unit.

The stacking table has a receiving groove formed therein to receive the lighting device, wherein the receiving groove is open so as to cover a radius of an acute angle range to which the light of the lighting device is emitted.

The stacking main body may include a guide shaft configured to be operated to allow the stacking main body to move vertically in a direction perpendicular to the first surface of the stacking main body.

The stacking main body stacks a plurality of first stacked bodies by a plurality of reciprocating movements in the direction from the first side of the rotary shaft to the second side of the rotary shaft, and the lighting device emits light for each first stacked body as the stacked body reciprocates from the first side to the second side by the rotary shaft, so that stacking inspection may be performed in real-time.

An inspection method for an apparatus for inspecting stacking of electrodes of a secondary battery may include: forming a first stacked body, which includes: stacking a first separator supplied from a separator supply device on a stacking table of a stacking main body; stacking a first electrode plate on the first separator by a stacking jig; stacking a second separator supplied from the separator supply device on the first electrode plate; and stacking a second electrode plate on the second separator by the stacking jig, and performing a first inspection process, which includes: coupling a fixing jig configured to fix the first stacked body in a stacking direction on the first stacked body; emitting, by alighting device, light having a path passing through an open hole of the fixing jig and through the first stacked body; and capturing, by a capturing unit, an image of the light that has passed through the first stacked body, wherein the forming the first stacked body and the performing the first inspection process are repeated a plurality of times, and the first inspection process is performed on a previously formed first stacked body among a plurality of first stacked bodies.

The emitting, by the lighting device, the light having the path passing through the open hole of the fixing jig and through the first stacked body may further include adjusting an angle of the light emitted by the lighting device.

The forming the first stacked body may include: allowing the stacking main body to rotate in a first direction of a rotary shaft to stack the first separator supplied from the separator supply device on the stacking table of the stacking main body; stacking the first electrode plate on the first separator by the stacking jig; allowing the stacking main body to rotate in a second direction of the rotary shaft to stack the second separator on the first electrode plate; and stacking the second electrode plate on the second separator by the stacking jig.

In addition, the forming the first stacked body may further include: allowing a center of the rotary shaft to move toward an upper part and a lower part in the stacking direction of the first stacked body by a guide shaft as the stacking main body reciprocates in the first or second direction of the rotary shaft.

The features and advantages of the present disclosure will become more apparent from the following detailed description taken in conjunction with the accompanying drawings.

Prior to this, the terms or words used in the present specification and claims should not be construed in their ordinary and dictionary meanings, and it should be interpreted as a meaning and concept consistent with the technical idea of the present disclosure based on the principle that the inventor can properly define the concept of a term in order to explain his invention in the best way.

According to an embodiment of the present disclosure, the apparatus provides an effect of securing reliability and efficiency of an electrode stacking process of a secondary battery.

The apparatus provides effects of securing stacking reliability of a final electrode assembly and effectively decreasing defect rate through real-time stacking inspection of the electrode stacking process of a secondary battery.

The electrode stacking inspection is performed in real-time in the electrode stacking process of a secondary battery through a transmission method by a lighting device, and thus the apparatus provides an effect of increasing correction and accuracy in the stacking inspection.

In addition, a unit stacked body stacked in real-time in the electrode stacking process of a secondary battery is continuously performed in real-time in the electrode stacking process of a secondary battery through the transmission method, and thus the apparatus provides effectiveness and reliability of a transmission-type stacking inspection by the lighting device.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
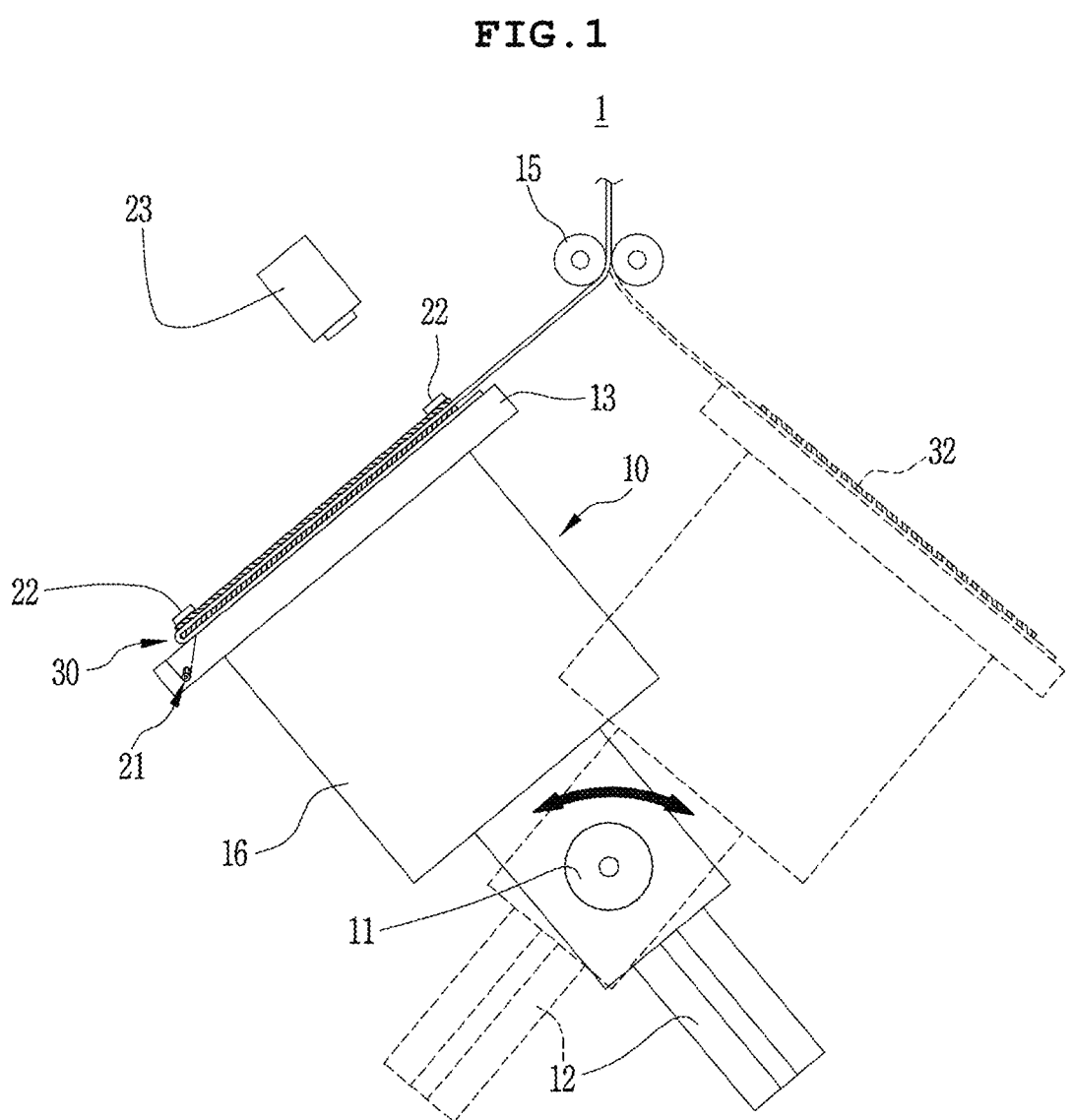
FIG. 1 is an operation schematic diagram of an apparatus for inspecting stacking of electrodes of a secondary battery according to an embodiment of the present disclosure.

The objectives, specific advantages, and novel features of the invention will become more apparent from the following detailed description and preferred embodiments taken in conjunction with the accompanying drawings. In the present specification, in adding reference numbers to the components of each drawing, it should be noted that only the same components are given the same number as possible even though they are indicated on different drawings. In addition, terms, such as "one side", "other side", "first", "second", etc., are used to distinguish one component from another component, and the component is not limited by the terms. Hereinafter, in describing the present disclosure, detailed descriptions of related known technologies that may unnecessarily obscure the gist of the present disclosure will be omitted.

Hereinafter, an embodiment of the present disclosure will be described in detail with reference to the accompanying drawings, wherein like reference numerals indicate like members.

Figure 2:
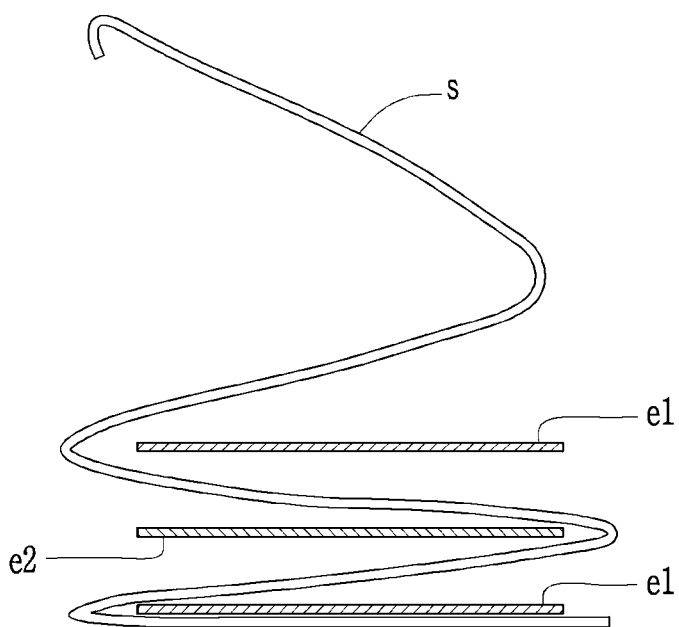
FIG. 2 is a schematic diagram of a direction in which a separator and an electrode plate are sequentially stacked on a stacking main body according to FIG. 1.
Figure 4:
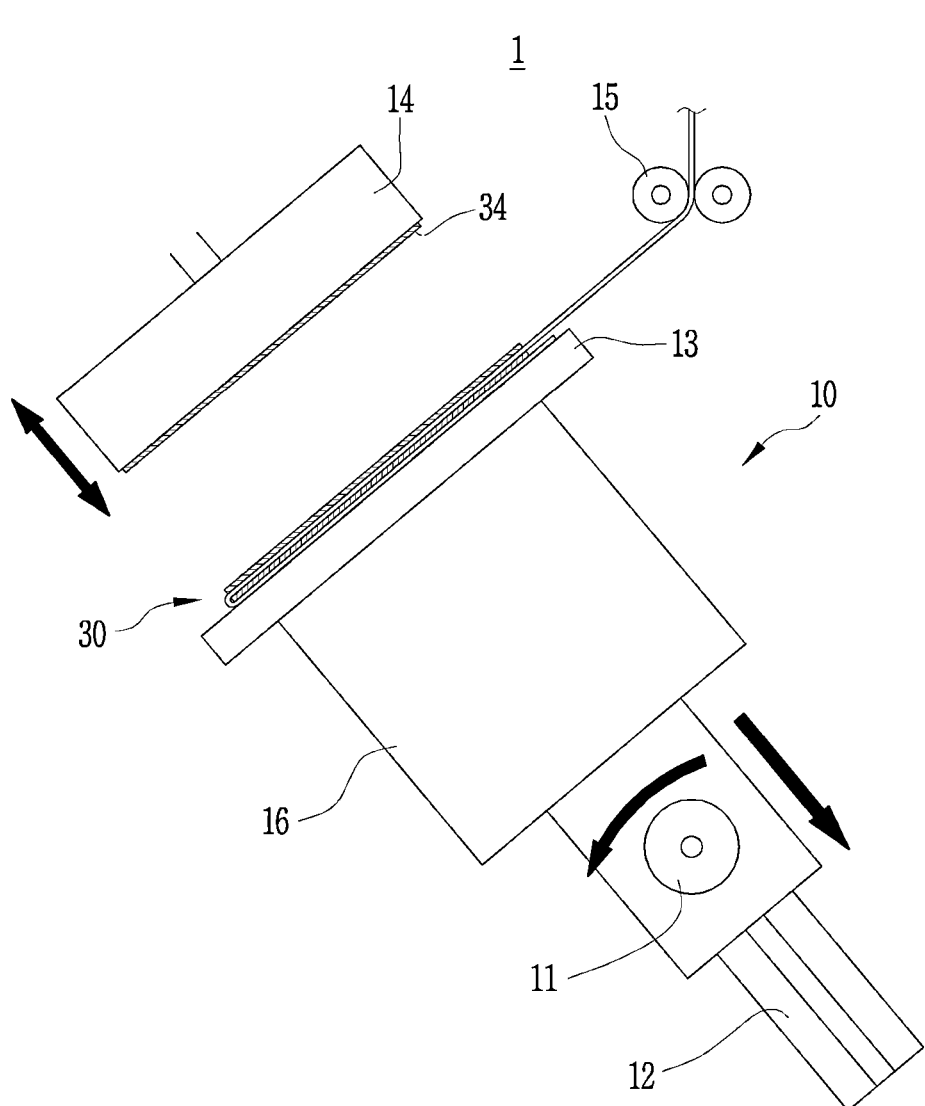
Figure 5:
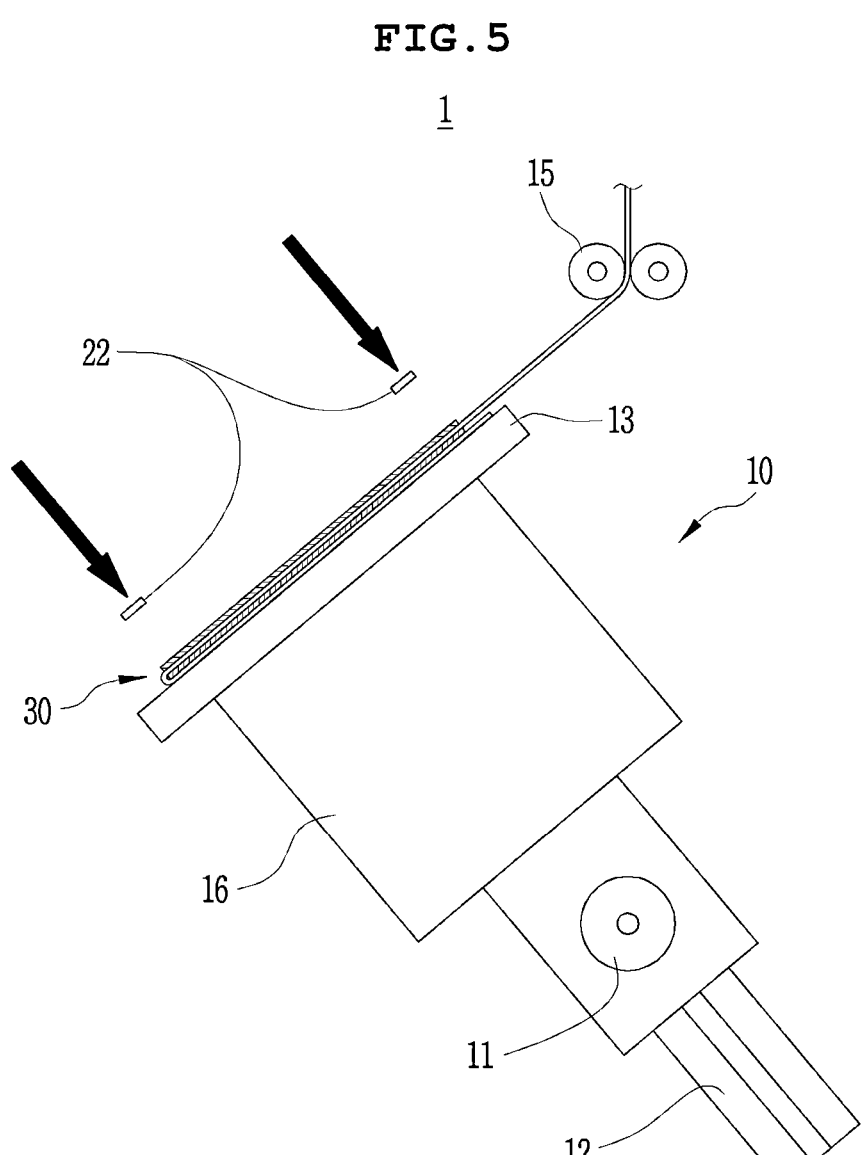
Figure 6:
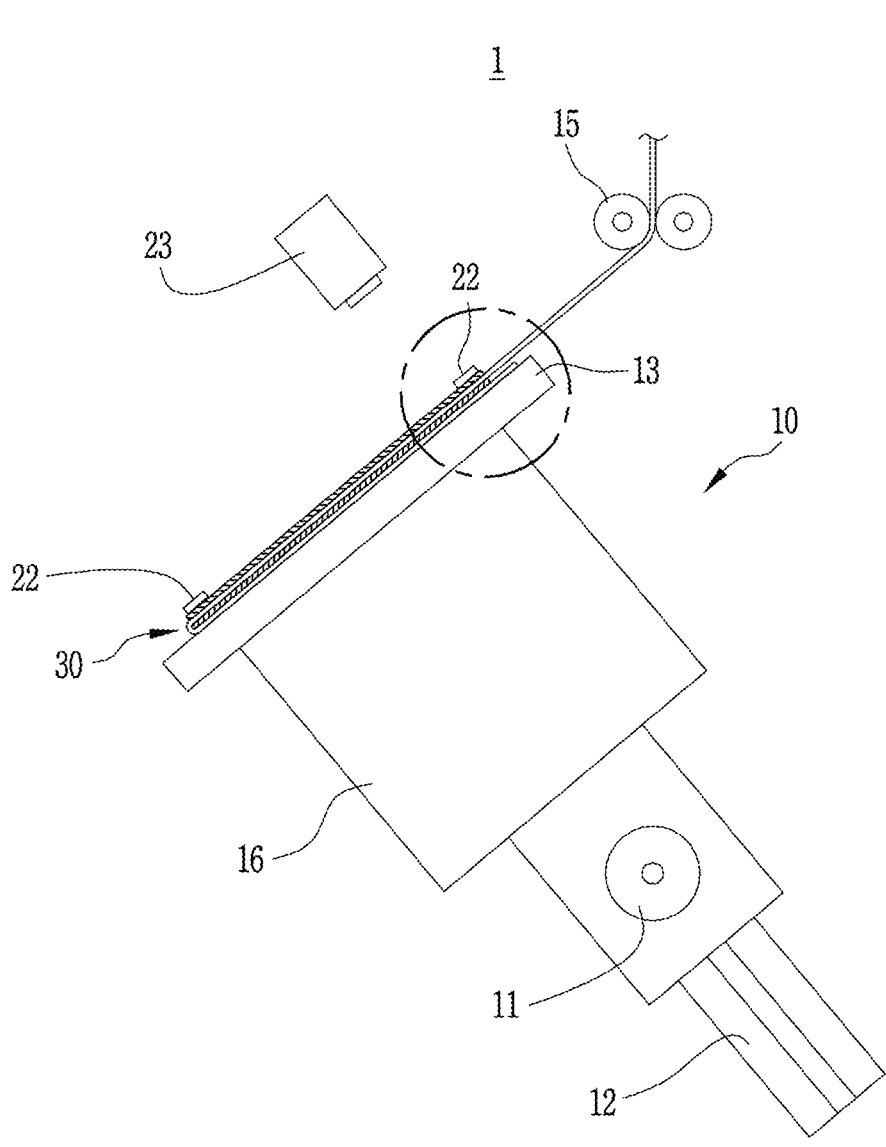
Figure 7:
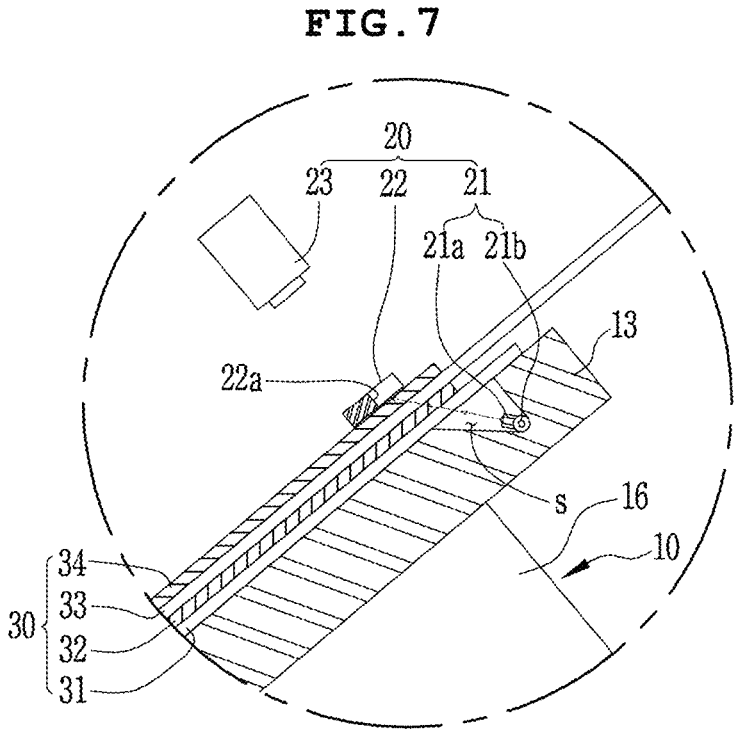
FIG. 7 is an enlarged view of an inspection portion of the first stacked body of FIG. 6.

FIG. 1 is an operation schematic diagram of an apparatus for inspecting stacking of electrodes of a secondary battery according to an embodiment of the present disclosure, FIG. 2 is a schematic diagram of a direction in which a separator and an electrode plate are sequentially stacked on a stacking main body 16 according to FIG. 1, FIGS. 3 to 6 are views illustrating a process for inspecting a first stacked body 30 according to an embodiment of the present disclosure, and FIG. 7 is an enlarged view of an inspection portion of the first stacked body 30 of FIG. 6.

An apparatus for inspecting stacking of electrodes of a secondary battery according to an embodiment of the present disclosure may include a separator supply device 15 configured to supply a separator, a stacking main body 16 having a stacking table 13 formed on one surface and configured to allow the separator to be stacked on the stacking table 13, a stacking jig 14 configured to stack an electrode plate on the separator stacked on the stacking main body 16, a fixing jig 22 configured to fix one surface of the electrode plate in a stacking direction, a lighting device 21 configured to emit light from one surface of the stacking table 13 to allow the light to pass sequentially through the separator and the electrode plate, and a capturing unit 23 configured to capture an image of the light that has passed through the separator and the electrode plate by the lighting device 21, wherein the fixing jig 22 is disposed on a path of the light that is emitted from the lighting device 21 and passes through the separator and the electrode plate, and an open hole 22a is formed on an extension line of the path of the light that passes through the separator and the electrode plate.

As illustrated in FIG. 1, in the apparatus for inspecting stacking of electrodes of a secondary battery according to an embodiment of the present disclosure, a separator is supplied from a separator supply device 15, and the stacking main body 16 is reciprocally rotated in one side direction to the other side direction. As the stacking main body 16 reciprocates from one side to the other side, the separator is naturally stacked on the stacking table 13 of the stacking main body 16, and as illustrated in FIG. 2, electrode plates e1 and e2 are respectively stacked on a separator s in a zigzag direction on one side and the other side of the stacking main body 16 by the stacking jig 14.

Although such a zigzag-type stacking method is illustrated as an example, the apparatus for inspecting stacking of electrodes of a secondary battery according to an embodiment of the present disclosure inspects stacking alignment or stacking state by light that passes through the stacked body from a lower surface of the stacked body to an upper exposure surface of the same by the lighting device 21 disposed on the stacking table 13 for each unit stacked body in real-time during a process of stacking the separator and the electrode plate, so that such a method may be also applied to various types of stacking processes.

Hereinafter, a zigzag-type stacking method of a separator and an electrode plate according to an embodiment of the present disclosure will be described as an example.

Figure 3:
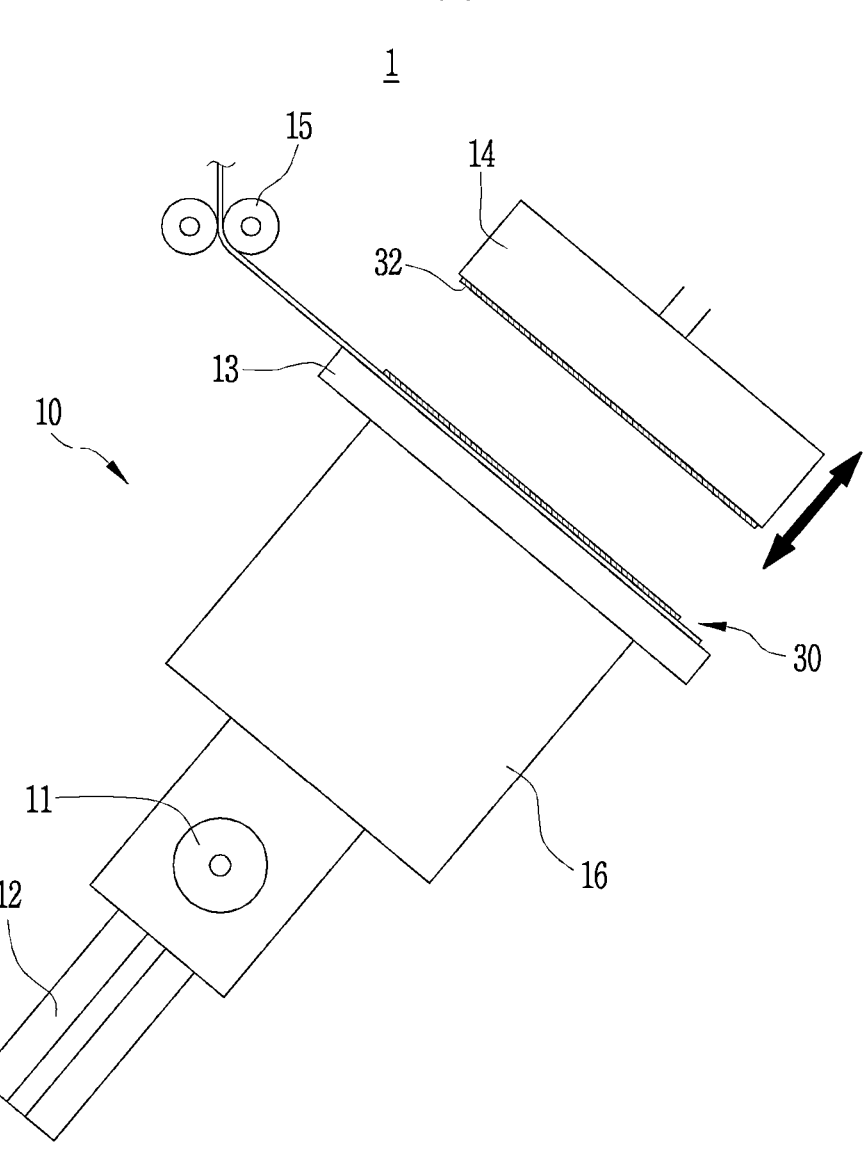
FIGS. 3 to 6 are views illustrating a process for inspecting a first stacked body according to an embodiment of the present disclosure.

In particular, as illustrated in FIGS. 3 and 4, an electrode stacking device 10 for a secondary battery according to an embodiment of the present disclosure stacks the separator supplied from the separator supply device 15 and at the same time, sequentially stacks a first electrode plate 32 and a second electrode plate 34 on one side and the other side thereof through the stacking jig 14, while reciprocally rotating in one side direction to the other side direction with respect to a rotary shaft 11. As such operation is repetitively performed, the separator and the electrode plate are alternately stacked, so that an electrode assembly may be formed.

The separator supply device 15 provides the separator in one direction, as illustrated in FIG. 3. In addition, as the stacking main body 16 reciprocates from one side to the other side with respect to the rotary shaft 11, the separator supply device 15 may naturally stack the separator on the stacking table 13 of the stacking main body in a zigzag direction.

When a stacking height increases during a process of stacking the separator and the electrode plate on the stacking table 13 of the stacking main body 16, a continuous electrode stacking process may be performed while a positive is naturally adjusted in a vertical direction by a guide shaft 12.

The stacking jig 14 stacks the electrode plate on the stacking table 13. When the separator is naturally stacked on the stacking table 13, while the stacking main body 16 reciprocally rotates from one side to the other side, the stacking jig 14 stacks the electrode plate on the separator. Such a process of stacking the separator and repetitively stacking the electrode plate on the separator is repetitively performed, and thus a unit stacked body or an electrode assembly of a secondary battery may be manufactured.

In other words, the electrode stacking device 10 sequentially and respectively stacks positive and negative plates of different polarities of the first electrode plate 32 and the second electrode plate 34 on one side and the other side with the separator interposed therebetween, thereby forming an electrode assembly.

The electrode stacking device 10 may further include an image capturing device 20 disposed on the stacking table 13 to inspect electrode stacking alignment or electrode stacking state of the unit stacked body. The image capturing device 20 may include the lighting device 21, the fixing jig 22, and the capturing unit 23, and each configuration will be described below.

When the unit stacked body is stacked on the stacking table 13, the fixing jig 22 softly presses and fixes an upper surface of the unit stacked body so that the electrode stacking state may be inspected. When one unit stacked body is stacked during the electrode stacking process, the fixing jig 22 is fixed on the stacked body and the lighting device 21 emits light in a direction penetrating the stacked body, so that the capturing unit 23 captures an image, and thus it is possible to inspect the stacking alignment and the stacking state.

In an embodiment of the present disclosure, the lighting device 21 emits light toward each corner or at least two corners of the unit stacked body disposed on the stacking table 13, so that the capturing unit 23 may capture an image thereof. However, it is not limited to the number of such locations or points.

On the other hand, in the fixing jig 22, the open hole 22a may be formed on a path of light that is emitted from the lighting device 21 and passes through the unit stacked body, and the capturing unit 23 may capture an image representing the stacking alignment or stacking state of the stacked body through the light that passes through the stacked body and passes through the open hole 22a.

Figure 14:
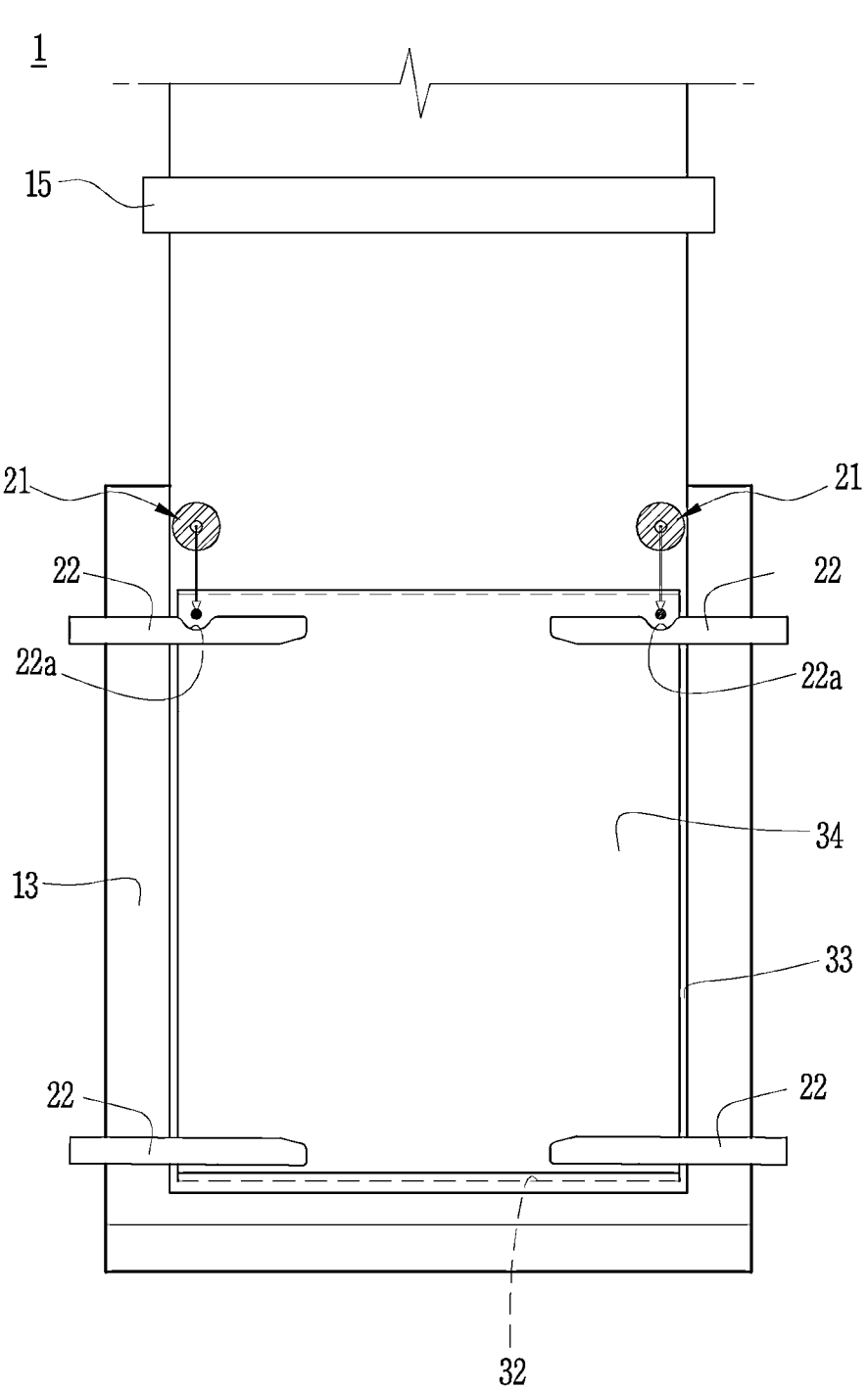
FIG. 14 is a plan view of an apparatus for inspecting stacking of electrodes of a secondary battery according to an embodiment of the present disclosure.

The open hole 22a is an area through which the light emitted from the lighting device 21 may pass and may be photographed, that is, an area for securing optimal fixation of the stacked body through the fixing jig 22 and, at the same time, efficiently securing a penetration position of the light for efficiently inspecting the stacking alignment and state. As illustrated in FIG. 14, the fixing jig 22 is disposed (positioned) on one surface of the first stacked body 30, and then open hole 22a may be formed on a path of light that has passed through the first stacked body 30.

In an embodiment of the present disclosure, the first stacked body 30 as a unit stacked body is defined as a first separator 31, a first electrode plate 32, a second separator 33, and a second electrode plate 34, wherein the first electrode plate 32 and the second electrode plate 34 may be formed of a positive electrode plate or a negative electrode plate having opposite polarities.

When the unit stacked body is stacked, the lighting device 21 may fix the stacked body by the fixing jig 22 during the stacking process of the electrode stacking device 10 to check the electrode stacking alignment or state in real-time. As described above, the electrode stacking alignment may be efficiently inspected through a transmission method by the lighting device 21 for each unit stacked body sequentially stacked in units of the first stacked body 30 that is the unit stacked body.

The lighting device 21 may include alighting unit 21a of alight source emitting light and an angle adjustment unit 21b for covering an adjustment range of an acute angle range of the light emitted from the lighting unit 21a.

That is, the angle adjustment unit 21b is for adjusting an emission angle of the light to emit the light that has passed through each unit stacked body during the electrode stacking process.

As illustrated in FIG. 7, to emit light to allow the light to penetrate the stacked body in a direction from a lower surface of the stacked body to an upper surface of the stacked body, the lighting device 21 is installed in a receiving groove S formed on the stacking table 13 and the receiving groove S may form an open part of a range for covering the emission range of the acute angle range of the light by the angle adjustment unit 21b of the lighting unit 21a.

An installation position of the lighting device 21 is arranged at an edge of the stacking table 13, that is, at a corresponding position of the edge of the stacked body, so that the electrode stacking alignment or state may be efficiently inspected, and it is also possible to change the installation position of the lighting device 21 depending on the state or stacking method of the stacked body.

Figure 10:
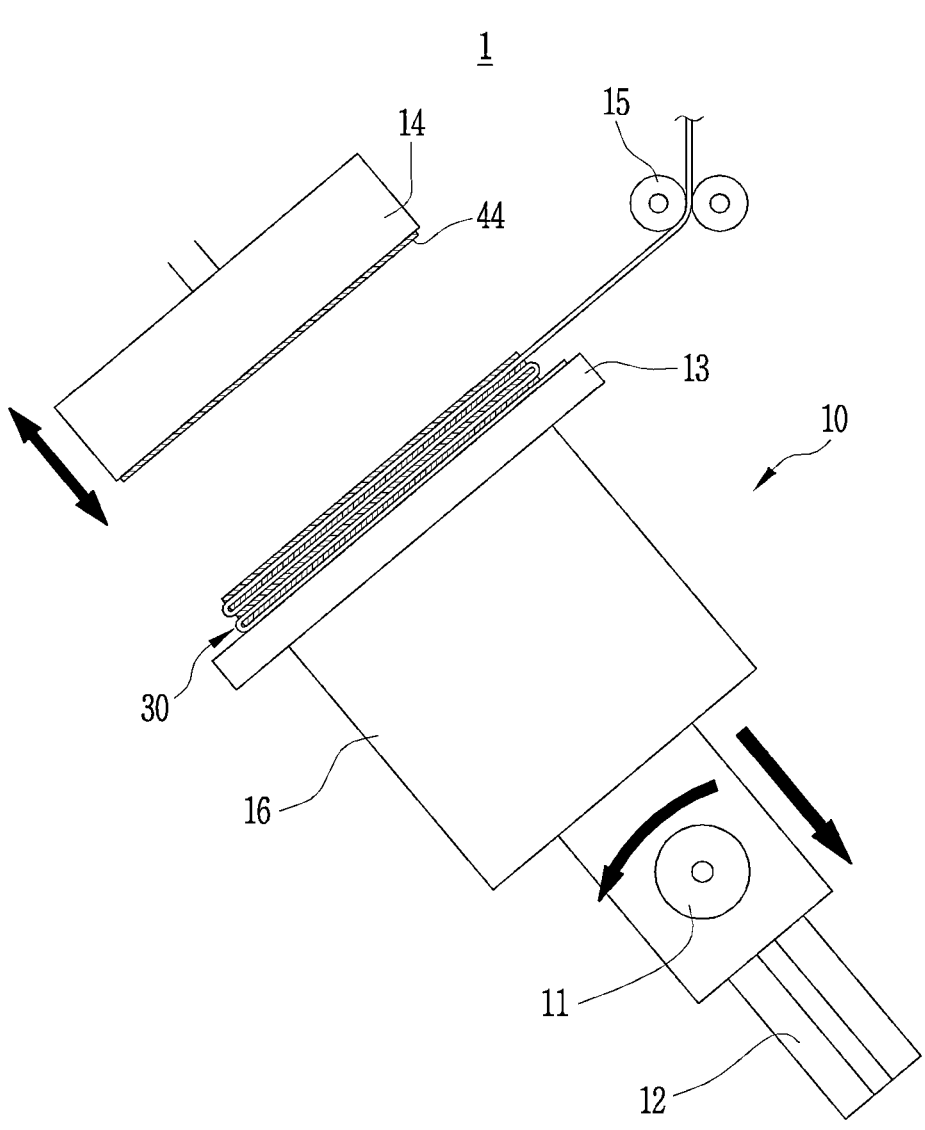
Figure 11:
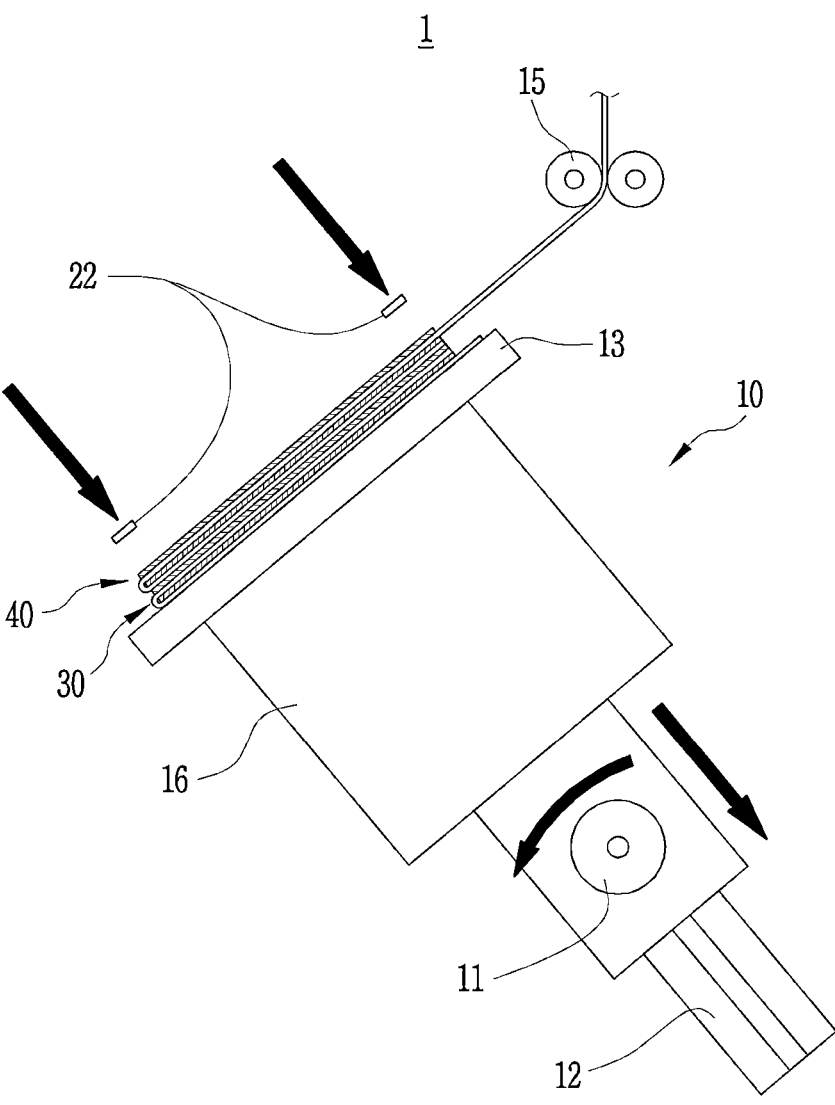
Figure 12:
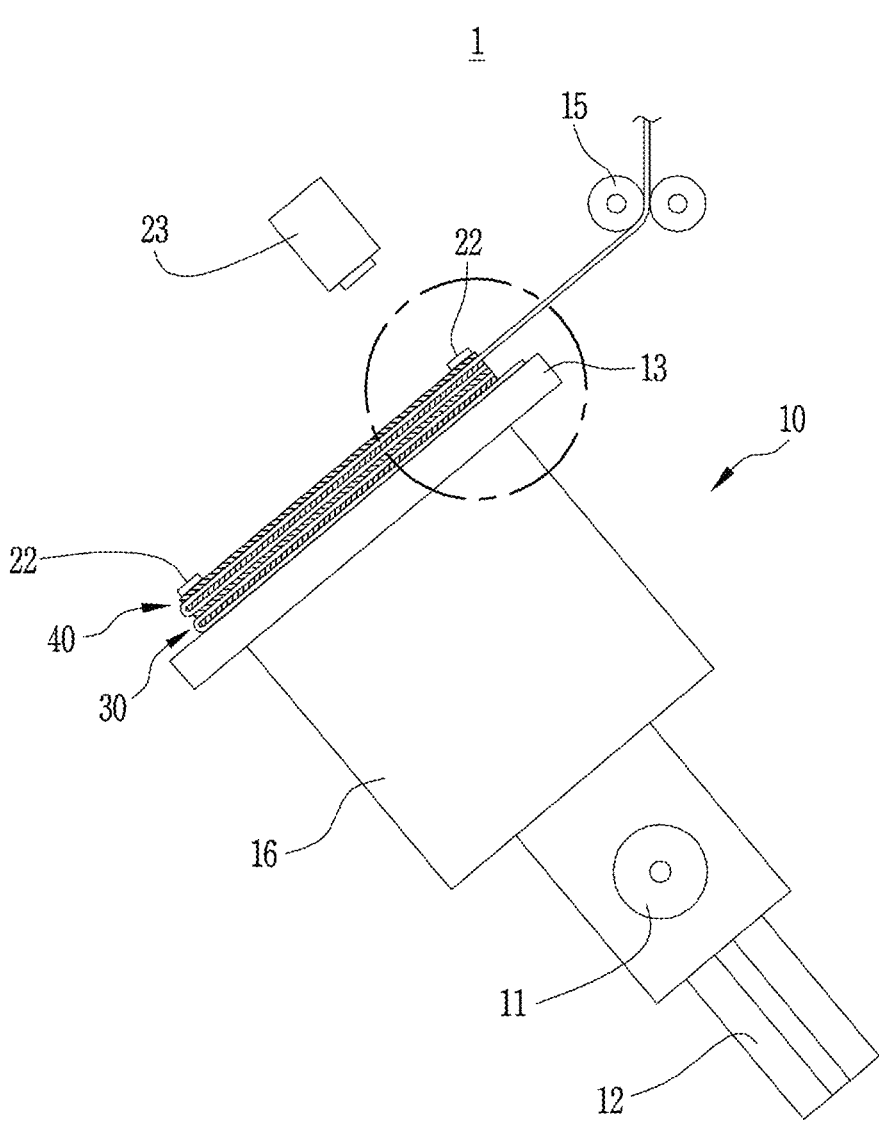
Figure 13:
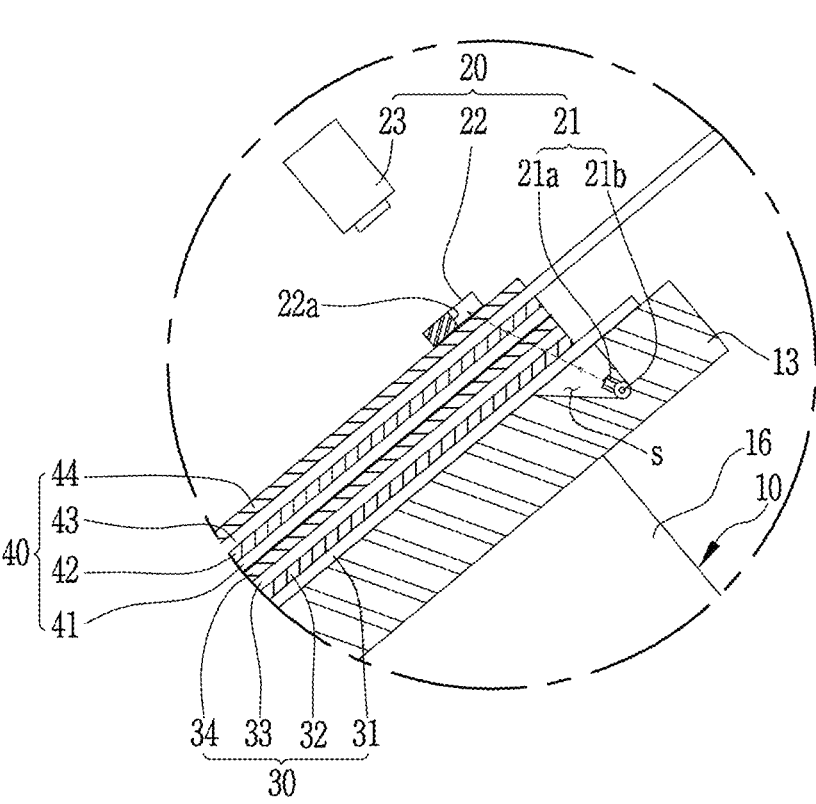
FIG. 13 is an enlarged view of an inspection portion of the second stacked body of FIG. 12.

FIGS. 8 to 12 are views illustrating a process for inspecting stacking of the second stacked body according to an embodiment of the present disclosure, FIG. 13 is an enlarged view of an inspection portion of the second stacked body of FIG. 12, and FIG. 14 is a plan view of an apparatus for inspecting stacking of electrodes of a secondary battery according to an embodiment of the present disclosure.

An inspection method for an apparatus for inspecting stacking of electrodes of a secondary battery according to an embodiment of the present disclosure may include forming a first stacked body, which includes: stacking a first separator 31 supplied from a separator supply device 15 on a stacking table 13 of a stacking main body 16; stacking a first electrode plate 32 on the first separator 31 by a stacking jig 14; stacking a second separator 33 supplied from the separator supply device 15 on the first electrode plate 31; and stacking a second electrode plate 34 on the second separator 33 by the stacking jig 14, and performing a first inspection process, which includes: coupling a fixing jig 22 configured to fix a first stacked body 30 in a stacking direction on the first stacked body 30; emitting, by a lighting device 21, light having a path passing through an open hole 22a of the fixing jig 22 through the first stacked body 30; and capturing, by a capturing unit 23, an image of the light that has passed through the first stacked body 30, wherein the forming the first stacked body 30 and the performing the first inspection process are repeated a plurality of times, and the first inspection process is performed on a previously formed single first stacked body among a plurality of first stacked bodies 30.

The inspection method for the apparatus for inspecting stacking of electrodes of a secondary battery according to an embodiment of the present disclosure inspects stacking alignment or state of electrodes for each unit stacked body at each point in time when the unit stacked body is formed during a process of sequentially stacking separators and electrode plates on the stacked body 16.

Therefore, in the inspection method for the apparatus for inspecting stacking of electrodes of a secondary battery, the stacking method itself is illustrated as the zigzag method according to an embodiment of the present disclosure, but is not limited thereto. However, it is also premised on a technical configuration capable of inspecting the stacking alignment or state of the electrodes in real-time in units of a corresponding unit stacked body whenever the unit stacked body is stacked in a sequential stacking process of the separator and the electrode plate.

Hereinafter, a stacking method of a separator and an electrode plate in a zigzag direction according to an embodiment of the present disclosure will be described as an example.

In a first, as illustrated in FIG. 3, the first separator 31 supplied from the separator supply device 15 is stacked on the stacking table 13 of the stacking main body 16. That is, the stacking main body 16 rotates in one direction with respect to a rotary shaft 11 so that the first separator 31 is stacked from the separator supply device 15 on the stacking table 13.

The separator supplied from the separator supply device 15 moves in the zigzag direction while the stacking main body 16 reciprocates from one side to the other side with respect to the rotary shaft 11, and thus the separator and the electrode plate are sequentially and alternately stacked on the stack table 13.

Next, the first electrode plate 32 is staked on the separator by the stacking jig 14. That is, as illustrated in FIG. 3, the first electrode plate 32 is stacked on the first separator 31 by the stacking jig 14. The first electrode plate 32 may be a negative electrode plate or a positive electrode plate, and is formed of an electrode plate having a polarity opposite to that of the second electrode plate 34 to be stacked thereafter.

Next, the second separator 33 supplied from the separator supply device 15 is stacked on the first electrode plate 32.

As illustrated in FIG. 4, the second separator 33 is naturally stacked on the first electrode plate 32 while the stacking main body 16 rotates in the other direction with respect to the rotary shaft 11. The second separator 33 is naturally stacked on the first electrode plate 32 by the separator supply device 15 in a central direction of the rotary shaft 11 while moving in the other direction with respect to the rotary shaft 11.

Next, the second electrode plate 34 is stacked on the second separator 33 by the stacking jig 14 to form the first stacked body 30. The first stacked body 30 is defined as a stacked body of the first separator 31, the first electrode plate 32, the second separator 33, and the second electrode plate 34, and in addition, it is also possible to change and adjust a necessary unit stacked body.

The second electrode plate 34 is stacked on the second separator 33 by the stacking jig 14. As described above, the second electrode plate 34 may be an electrode plate having a polarity different from that of the first electrode plate 32.

When the first stacked body 30 formed of the first separator 31, the first electrode plate 32, the second separator 33, and the second electrode plate 34 is stacked during the electrode stacking process, as illustrated in FIG. 5, the fixing jig 22 is coupled to one surface of the outermost second electrode plate 34 to fix the first stacked body 30. That is, the fixing jig 22 for fixing the second electrode plate 34 to press the second electrode plate 34 is coupled to the second electrode plate 34.

Here, pressurization does not mean that a substantial predetermined pressure is applied, but rather a coupling force of a conventional fixing jig 22 for fixing the first stacked body 30. As illustrated in FIG. 14, the fixing jig 22 is the same as the fixing jig 22 of an apparatus for inspecting stacking of electrodes of a secondary battery according to an embodiment of the present disclosure, and a detailed description thereof will be omitted.

Next, as illustrated in FIGS. 6 and 7, when the first stacked body 30 is fixed on the stacking table 13 by the fixing jig 22, the lighting device 21 emits light of a path that sequentially passes through the first separator 31, the first electrode plate 32, the second separator 33, and the second electrode plate 34 from an upper surface of the stacking table 13 and passes through the open hole 22a of the fixing jig 22.

Next, the first inspection process is completed by allowing the capturing unit 23 to capture an image of the light that has passed through the first stacked body 30. The first inspection process may be repeatedly performed in real-time during a stacking process of the electrode stacking device 10 as described above.

At this time, as illustrated in FIG. 7, the stacking alignment or state of electrodes may be inspected by a transmission method in which light emitted from the lighting device 21 penetrates each unit stacked body in a direction from a lower part to an upper part. That is, the lighting unit 21a of the lighting device 21 installed on the receiving groove S of the stacking table 13 emits light at a predetermined angle to pass through the first stacked body 30 and the capturing unit 23 captures an image of the transmitted light, and thus the stacking state of the first stacked body 30 may be inspected by the transmission method.

After the first stacked body 30 is formed, as a process of performing the first inspection process is repeated, the stacking alignment or state of electrodes of each unit stacked body may be continuously inspected during an electrode stacking process of a secondary battery in real-time.

Specifically, a process repeated after the formation of the first stacked body 30 will be defined as the second stacked body 40 and will be described later.

Figure 8:
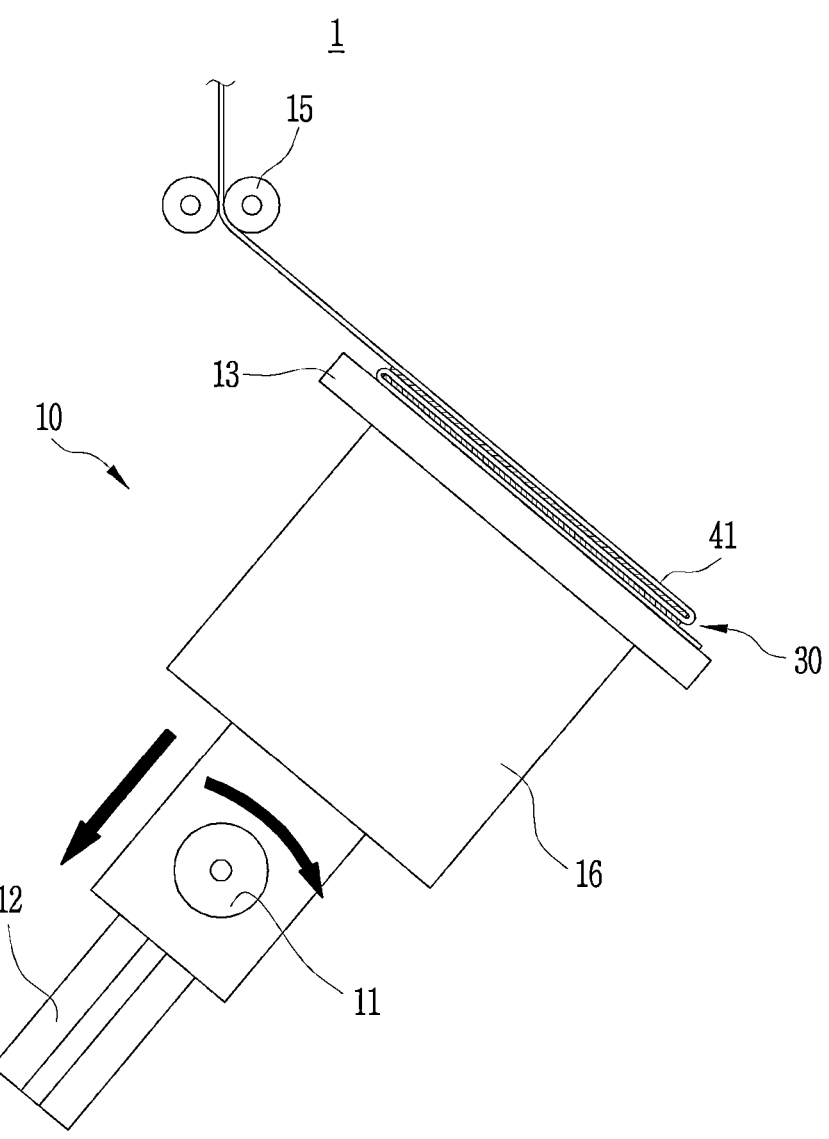
FIGS. 8 to 12 are views illustrating a process for inspecting stacking of a second stacked body according to an embodiment of the present disclosure.

First, as illustrated in FIG. 8, while the stacking main body 16 rotates at a predetermined angle in one direction with respect to the rotary shaft 11, a third separator 41 is stacked on the second electrode plate 34 from the separator supply device 15.

Figure 9:
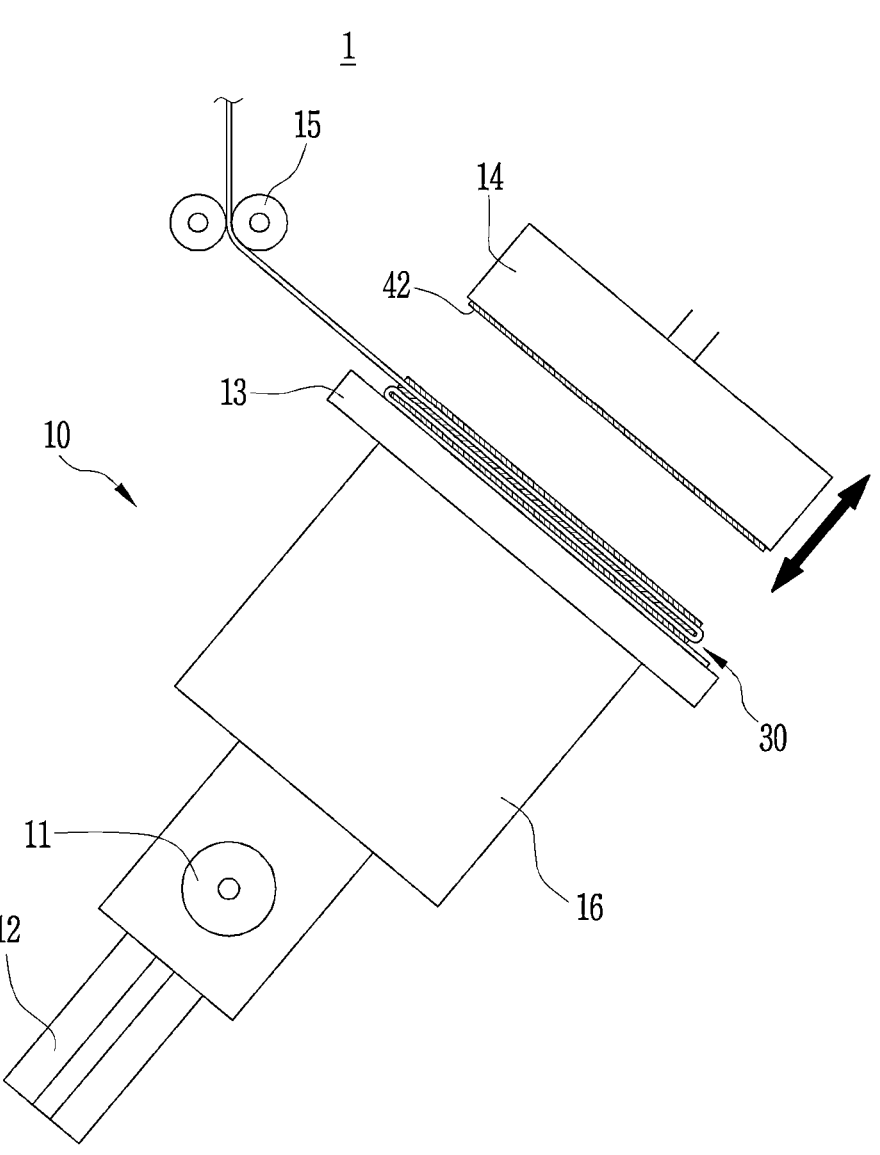

Next, as illustrated in FIG. 9, a third electrode plate 42 is stacked on the third separator 41 by the stacking jig 14. Here, the third electrode plate 42 may be formed of an electrode plate having a polarity different from that of a fourth electrode plate 44 to be described later.

Next, as illustrated in FIG. 10, a fourth separator 43 is stacked on the third electrode plate 42 while the stacking main body 16 rotates at a predetermined angle in the other direction with respect to the rotary shaft 11 and a fourth electrode plate 44 is stacked on the fourth separator 43 by the stacking jig 14. In this way, the second stacked body 40 is stacked on the first stacked body 30.

Next, to inspect the stacking state or alignment of electrodes of the second stacked body 40, as illustrated in FIG. 11, the fixing jig 22 for fixing and pressing the fourth electrode plate 44 is coupled to the fourth electrode plate 44. Here, the fixing jig 22 is the same as the fixing jig 22 in the above-described first inspection process, and the overlapping detailed description will be omitted.

Next, as illustrated in FIGS. 12 and 13, the first inspection process is repeatedly performed, wherein the first inspection process may include allowing the lighting device 21 to emit light in a path passing through only the second stacked body 40 in which the third separator 41, the third electrode plate 42, the fourth separator 43, and the fourth electrode plate 44 are sequentially formed to pass through the open hole 22a of the fixing jig 22, and allowing the capturing unit 23 to capture an image of the light that has passed through the second stacked body 40.

As illustrated in FIG. 13, in the first inspection process, only the second stacked body 40 stacked in the subsequent processes is inspected except for the first stacked body 30 stacked in the previous first process. To emit the light that has passed through the second stacked body 40, the lighting device 21 may include an angle adjustment unit 21b for adjusting a required light emission direction.

Moreover, the inspection method may include sequentially stacking the separator and the electrode plate while continuously repeating the first inspection process in this way and, at the same time, gradually and vertically lowering a center of the rotary shaft 11 in a lower side by a guide shaft 12 as a stacking height is increased. The guide shaft 12 may also selectively move up and down in a vertical direction as needed.

Figure 15:
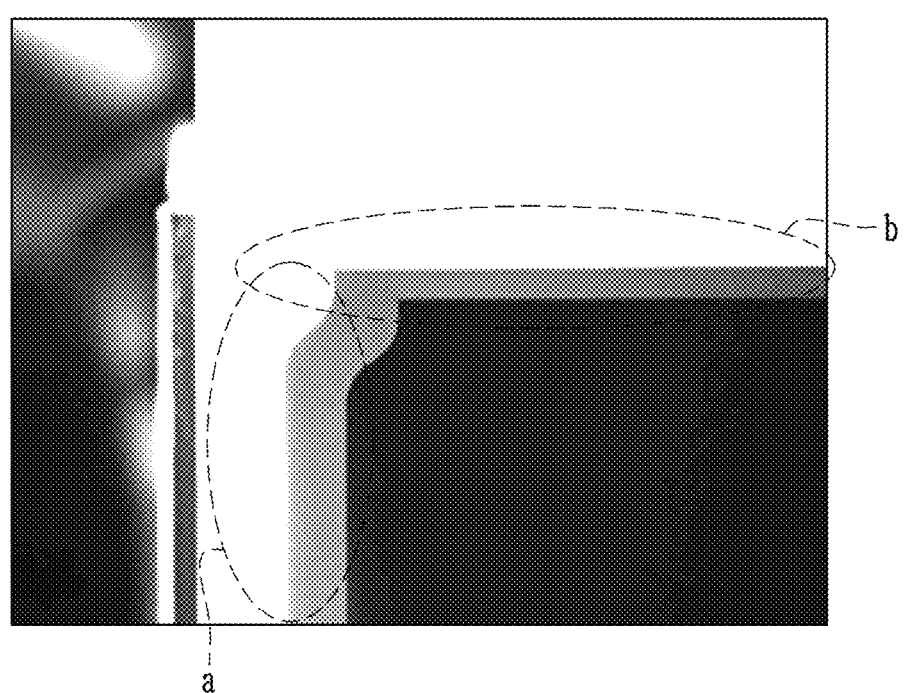
FIG. 15 is a photograph taken by an inspection method for an apparatus for inspecting stacking of electrodes of a secondary battery according to an embodiment of the present disclosure.
Figure 16:
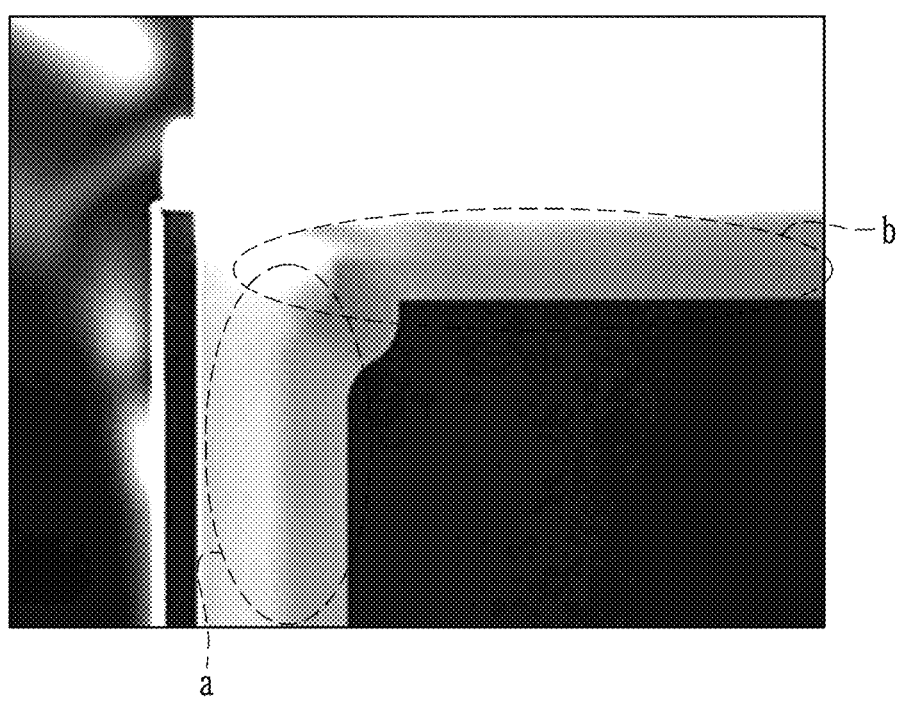
FIG. 16 is a photograph taken by a general method for inspecting stacking of electrodes of a secondary battery.

FIG. 15 is a photograph taken by an inspection method for an apparatus for inspecting stacking of electrodes of a secondary battery according to an embodiment of the present disclosure and FIG. 16 is a photograph taken by a general method for inspecting stacking of electrodes of a secondary battery.

Specifically, FIG. 15 is an image of an alignment state of a stacked body photographed by a transmission method through the inspection method for an apparatus for inspecting stacking of electrodes of a secondary battery according to an embodiment of the present disclosure, and FIG. 16, as a comparative example, is an image of photographed by a stacked body inspection method as a general non-transmission method.

As illustrated in FIG. 15, according to an apparatus for inspecting stacking of electrodes of a secondary battery and an inspection method thereof according to an embodiment of the present disclosure, images of edge areas a, b of a stacked body is accurately displayed so that stacking alignment may be accurately measured and inspected, but as illustrated in FIG. 16, according to a conventional method, edge regions a, b of the stacked body are indistinctly blurred images, so it can be seen that reliability of actual electrode stacking inspection cannot be ensured.

Although the preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. An inspection method for an apparatus for inspecting stacking of electrodes of a secondary battery, the method, comprising:

forming a first stacked body, which comprises:

allowing a stacking main body to rotate in a first direction of a rotary shaft to stack a first separator supplied from a separator supply device on a stacking table of the stacking main body;

stacking a first electrode plate on the first separator by a stacking jig;

allowing the stacking main body to rotate in a second direction of the rotary shaft to stack a second separator on the first electrode plate; and stacking a second electrode plate on the second separator by the stacking jig, and performing a first inspection process, which comprises:

coupling a fixing jig having an open hole configured to fix the first stacked body in a stacking direction on the first stacked body;

emitting, by a lighting device coupled to the stacking table that rotates together with the stacking main body, light having a path passing through the open hole of the fixing jig and through the first stacked body;

capturing, by a capturing unit, an image of the light that has passed through the open hole of the fixing jig and the first stacked body, wherein the open hole is opened toward an edge area of the first stacked body, wherein the forming the first stacked body and the performing the first inspection process are repeated a plurality of times, and the first inspection process is performed on a previously formed first stacked body among a plurality of first stacked bodies, and wherein the emitting comprises:

emitting light toward the first stacked body that is being stacked in real time by the lighting device coupled to the stacking table while the stacking table rotates in a first direction of the rotary shaft and a second direction of the rotary shaft; and adjusting, in real time during a repeated stacking process of the first stacked body, an emission angle of the light of the lighting device in an opening direction of the open hole of the fixing jig.

2. The method of claim 1, further comprising:

allowing a center of the rotary shaft to move toward an upper part and a lower part in the stacking direction of the first stacked body by a guide shaft as the stacking main body reciprocates in the first or second direction of the rotary shaft.

3. An apparatus for inspecting stacking of electrodes of a secondary battery, the apparatus, comprising:

a stacking main body in which a separator supplied by a separator supply device is stacked on one side of a stacking table;

a fixing jig coupled to an electrode plate to fix one side of the electrode plate stacked on the separator by a stacking jig; and a lighting device coupled to the stacking table that emits light at a determined angle in a direction that penetrates the separator and the electrode plate so that a capturing unit can capture an image of the emitted light, wherein the stacking main body comprises a rotary shaft and is configured to allow the separator to be stacked on the stacking table in a zigzag direction as reciprocating in a direction from a first side of the rotary shaft to a second side of the rotary shaft, wherein the stacking main body is configured to allow a first electrode plate to be stacked on a first separator in a first direction of the rotary shaft by the stacking jig, and is further configured to allow a second electrode plate to be stacked on a second separator in a second direction of the rotary shaft by the stacking jig, wherein the stacking main body is configured to stack a plurality of first stacked bodies by a plurality of reciprocating movements in the direction from the first side of the rotary shaft to the second side of the rotary shaft, and wherein the lighting device is configured to rotate together with the stacking table and to emit light, in real time, toward a first stacked body that is being stacked while the stacking table rotates in the first direction of the rotary shaft and the second direction of the rotary shaft, and is further configured to adjust, in real time during a repeated stacking process of the first stacked body, an emission angle of the light in an opening direction of an open hole of the fixing jig.

4. The apparatus of claim 3, wherein the stacking table has a receiving groove formed therein to receive the lighting device, and wherein the receiving groove is open so as to cover a radius of an acute angle range included in the determined angle at which the light of the lighting device is emitted.

5. The apparatus of claim 3, wherein the stacking main body comprises a guide shaft configured to be operated to allow the stacking main body to move vertically in a direction perpendicular to a first surface of the stacking main body.

6. The apparatus of claim 3, wherein the lighting device comprises a lighting unit and an angle adjusting unit, wherein the lighting unit is coupled to the angle adjusting unit to emit the light to pass the first stacked body, wherein one end of the angle adjusting unit is coupled to the lighting unit and the other end is installed in a receiving groove in the stack table to adjust an emission range within an acute angle included in the determined angle of light emitted by the lighting unit.

7. The apparatus of claim 6, wherein the open hole of the fixing jig is open toward one edge of the first stacked body.

* * * * *